United States Patent

[11] 3,625,417

[72] Inventor John W. Slauter
5976 Wedgewood Drive, Mentor-on-the Lake, Ohio 44060
[21] Appl. No. 864,027
[22] Filed Oct. 6, 1969
[45] Patented Dec. 7, 1971

[54] CALCULATOR MEANS FOR BOATING
9 Claims, 12 Drawing Figs.
[52] U.S. Cl. .................................... 235/61 NV,
33/76 VA, 235/61 GM
[51] Int. Cl. .................................... G06c 1/00
[50] Field of Search ......................... 235/61 NV,
61 GM, 78, 61 B, 88; 33/76 VA

[56] References Cited
UNITED STATES PATENTS

| | | | |
|---|---|---|---|
| 1,828,807 | 10/1931 | Kennedy | 33/76 VA |
| 2,244,125 | 6/1941 | Siefker | 235/61 B |
| 2,482,424 | 9/1949 | McConnell | 33/76 VA |
| 3,131,858 | 5/1964 | Warner | 235/61 B |
| 3,137,443 | 6/1964 | Samuelson | 235/61 B |
| 3,159,339 | 12/1964 | Peddle, Jr. | 235/61 B |
| 3,361,346 | 1/1968 | Warner | 235/61 NV |

FOREIGN PATENTS

| 368,991 | 3/1932 | Great Britain | 235/61 B |
|---|---|---|---|

Primary Examiner—Richard B. Wilkinson
Assistant Examiner—Stanley A. Wal
Attorney—Sam E. Laub ABSTRACT: A wind velocity calculator has a primary vector member with a calibrated scale, a secondary vector member having a calibrated scale thereon movably connected with the primary vector member and a resulting vector member having a calibrated scale thereon movably connected with the primary vector member and the secondary vector member. The resulting vector member has defined regions of a pinching zone and a spinnaker zone. One embodiment of the calculator has a series of assembled plates. The two plates resting on the bottom plate have holes therein for disks to be held in the plates, these disks being rotatably held in the plates and each disk having a scale. Another embodiment has three ruler means each having a scale being pivotally and slideably connected together. Here the resulting vector member has a circular protractor means which has defined thereon a pinching zone and a spinnaker zone.

INVENTOR.
JOHN W. SLAUTER

INVENTOR
JOHN W. SLAUTER

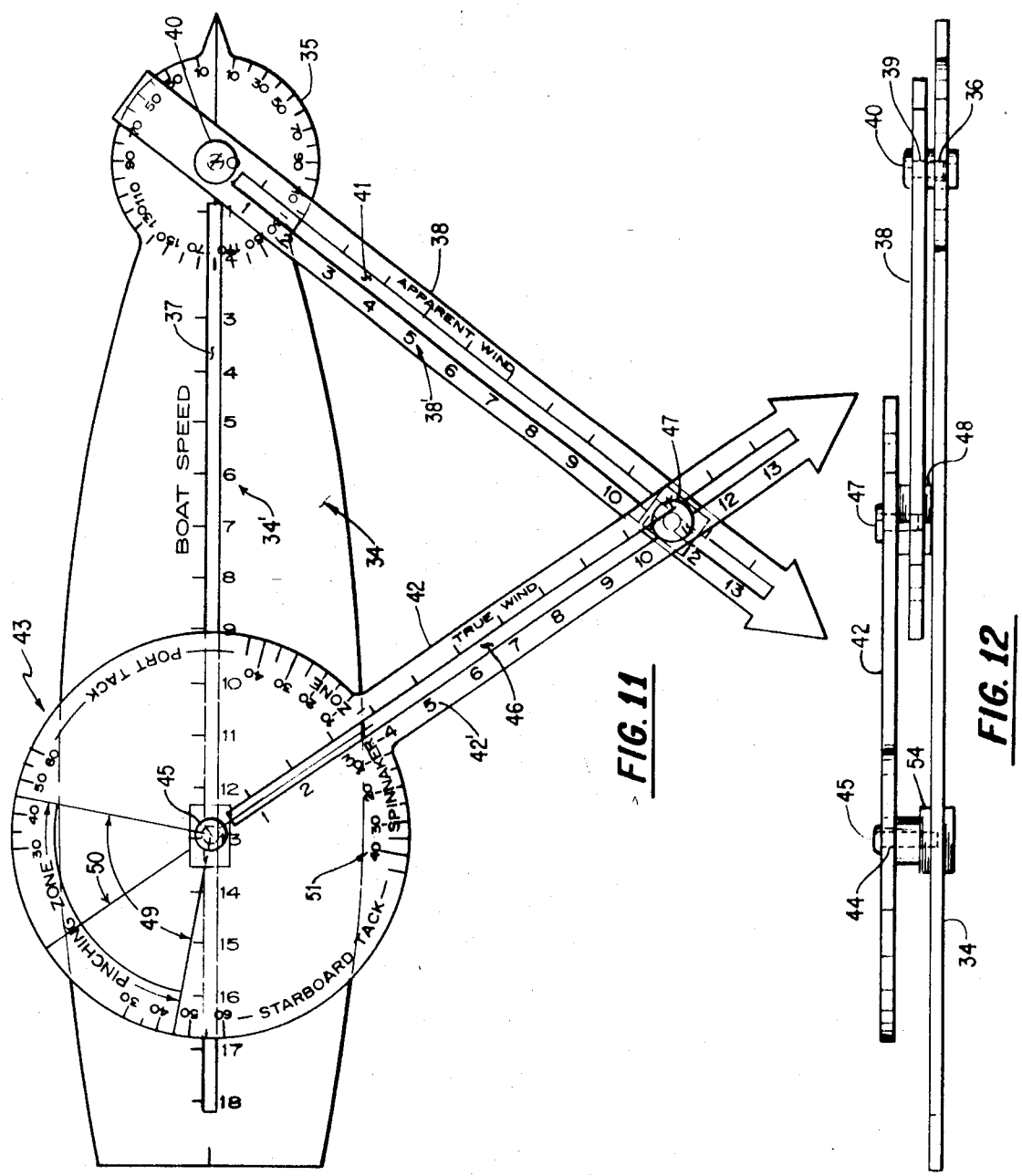

3,625,417

CALCULATOR MEANS FOR BOATING

BACKGROUND OF THE INVENTION

1. Field of the Invention

This invention relates to instruments enabling a rapid calculation of a resultant vector from a moving vehicle subjected to the velocity of the wind and, more particularly, to an instrument enabling a sailor to calculate the resulting direction and speed of the actual wind from his sailboat and to determine the directions in which changing the tack of his sailboat is hindered by the wind, called the pinching zone, and the region in which he can fly a spinnaker sail, called the spinnaker zone.

2. Description of the Prior Art

The phrase "to beat up wind" means to head the boat close into the wind. It is impossible to head a sailboat directly into the wind but most boats will sail approximately 45 degrees to the direction the wind is coming from. Heading in this general direction is called beating up wind. The term "to run down wind" means to head in the general direction in which the wind is blowing. When running in this direction it is possible to sail with the large parachute-type spinnaker sail in the front of the boat.

Vector instruments have been devised for working geometry problems such as a summation of vectors (or vector computers). Various instruments have been adapted to specific functions such as computers designed for pilots in the navigation of aircraft and surface craft which are subject to external forces affecting the course of motion of their vehicle. However the needs of the person in a sailboat extend beyond the solution of geometry problems involving the summation of vectors, particularly when he is racing his craft and is under pressure to have an immediate knowledge of available and precluded directions in which he can said his craft. When the sailor has calculated the actual direction of the wind prior to making a turn, he should also make determinations of the zone into which he cannot successfully change tack due to loss of wind in the sails if he intends to beat up wind, or if he intends to run down wind, the spinnaker zone in which he can use a spinnaker sail. It is also advantageous for a sailor on a long distance trip to be able to keep an accurate track of changes in the true wind thereby enabling him to predict wind changes and to chart the best course to his destination. There are no available calculating devices aiding the sailor in these determinations.

SUMMARY OF THE INVENTION

It is an object of this invention to provide an instrument enabling a person to make determinations useful in sailing a craft including calculating the actual wind velocity through summations of the craft velocity and apparent wind velocities.

An additional object of this invention is to provide in one embodiment an improved navigational computer comprising a single, compact unit having the facilities essential to the resolution of navigational problems incident to sailing a vessel.

A further object of this invention is to provide an improved arrangement and association of movable elements capable of being positioned to manifest observed and detected data for the immediate translation of such data into determinations useful in piloting a sailing vessel including the determination of the pinching zone and the spinnaker zone.

With the foregoing and other objects and advantages of this invention in view from a reading of the following description, the invention will be seen to be in the construction, arrangement and combination of elements hereinafter set forth, as pointed out in the appended claims and as illustrated in the accompanying drawings.

DESCRIPTION OF THE DRAWINGS

FIG. 11 represents a top view of another embodiment of the calculator of this invention which is an adaptation of calibrated rulers and is easily mounted within a sailing vessel for ready availability for calculations.

FIG. 12 is a side view of the calculator shown in FIG. 11.

DESCRIPTION OF THE PREFERRED EMBODIMENTS

This invention presents a calculator for sailing applications which has a primary vector member (boat speed member) having thereon a calibrated scale (boat speed scale), a secondary vector member (apparent wind speed member) having thereon a calibrated scale (apparent wind speed scale) movably connected with the primary vector member, and a resulting vector member (true wind speed member) having thereon a calibrated scale (true wind speed scale) movably connected with the primary vector member and the secondary vector member, the resulting vector member having defined thereon a pinching zone and a spinnaker zone.

One of the problems that this instrument is designed to solve is the problem of determining the actual direction and speed of the wind from a moving vehicle. To illustrate one can visualize a person sitting in a stationary automobile while the wind is blowing at 20 miles per hour at the side of the car. If this person had a wind gauge, he could point the gauge toward the wind and it would read 20 miles per hour, and the person would know both the direction of the wind and its speed. If the person would try to get this measurement while the car is moving forward at 60 miles per hour (with the wind still blowing at the side of the car at 20 miles per hour), he would find that the wind appeared to be coming from a direction in front of and slightly to the side of the car. If he were to point his wind gauge into the wind he would find that it would read something in excess of 60 miles per hour. The calculating device disclosed herein would enable him to compute the direction and speed of the true wind (in the example, the 20 mile per hour wind at the side of the car) through use of the apparent wind speed and direction that the gauge indicates while the car is moving and the speed of the car from the car speedometer. In this invention the term "velocity" is used in its technical definition including both the speed and direction of motion at a particular instant.

Figure 1:
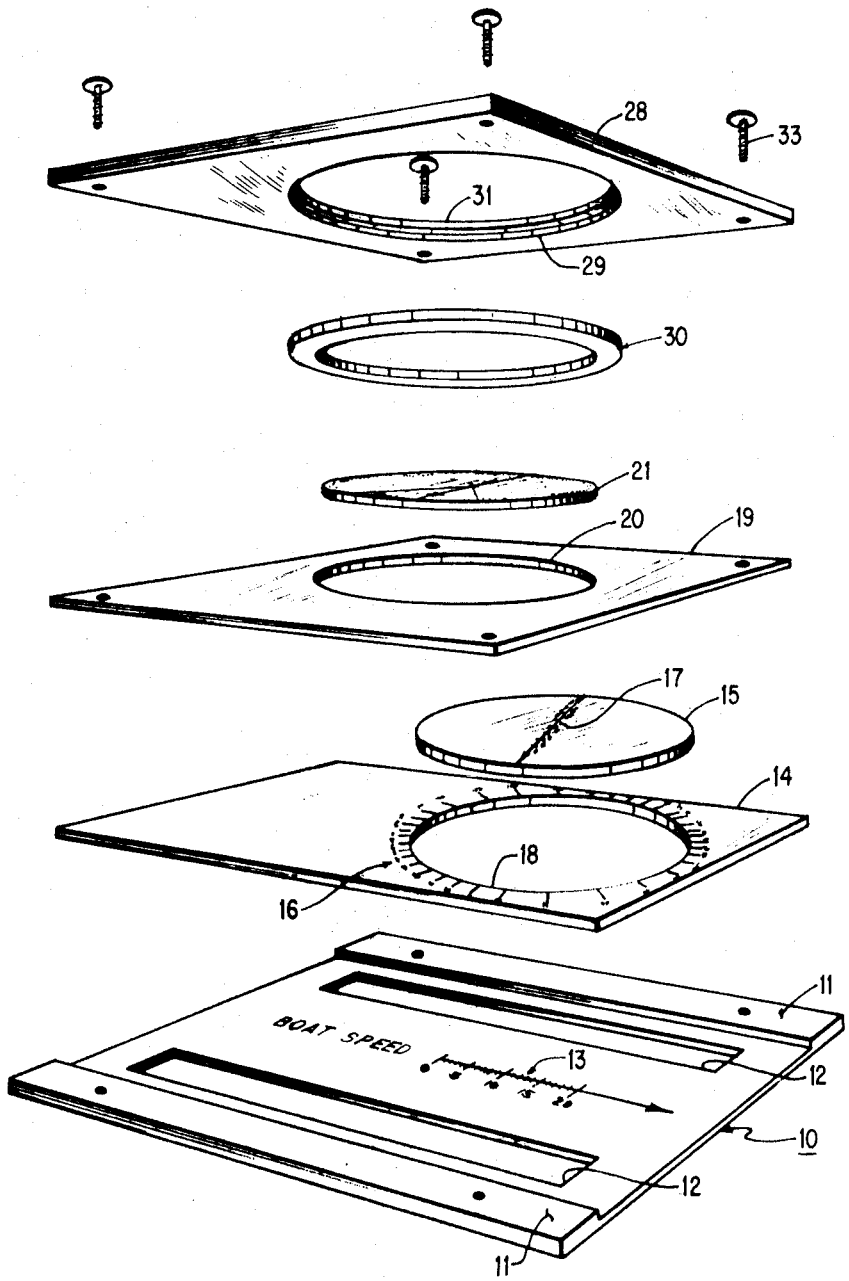
FIG. 1 represents an exploded view of one embodiment of the calculator of this invention which is a compact unit.
Figure 3:
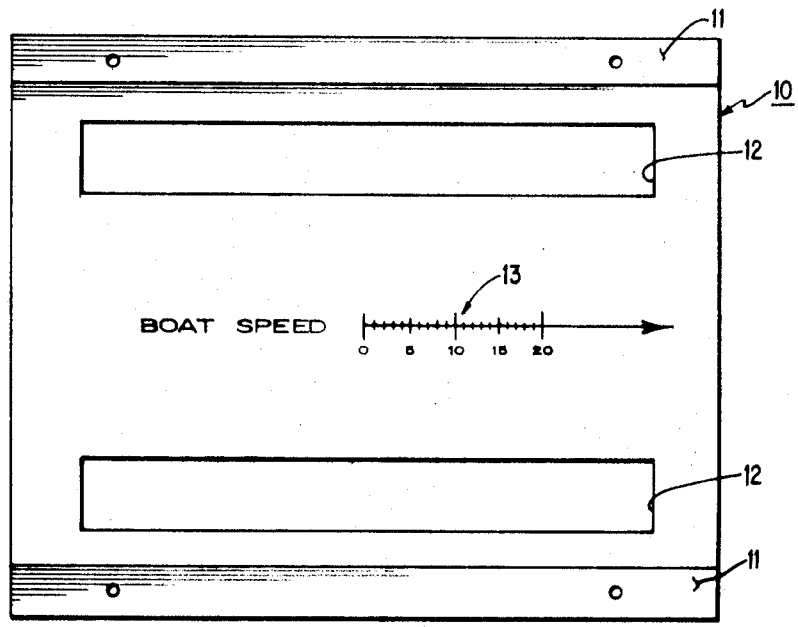
FIGS. 3 through 9 show top views of each major part of the calculator of FIG. 1 in isolation.

Referring now to the drawings and particularly to FIG. 1, there is shown an exploded view of a compact embodiment of the calculator of this invention in which a first or base plate 10, also shown alone in a top view in FIG. 3, has parallel restraining guides 11 on two opposite sides thereof an two openings (slots) 12 in plate 10 enabling the fingers of the operator to pass through to contact the components resting on plate 10. Near the middle of plate 10 is a primary vector, more particularly, the boat speed scale 13, calibrated in evenly spaced units with every fifth unit being numbered.

Figure 4:
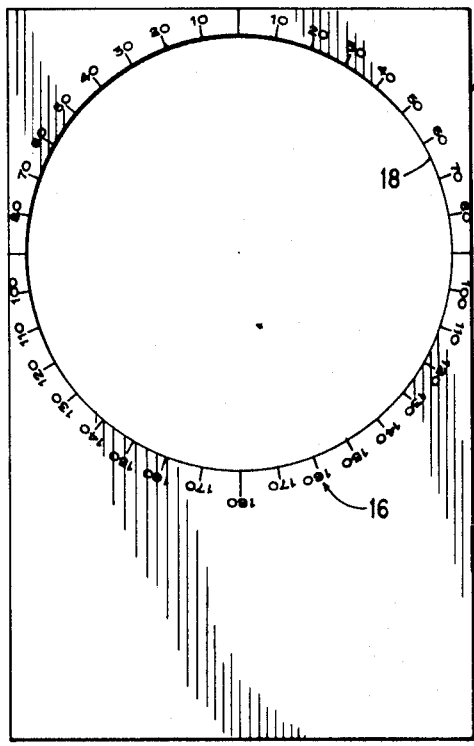
Figure 5:
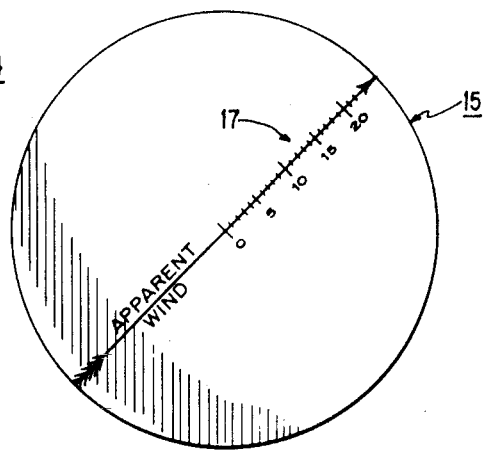

Slideably fitting between the parallel restraining guides 11 on base plate 10 is a second or apparent wind speed plate 14 (also shown alone in a top view in FIG. 4) which has a hole 18 therein capable of rotatably holding a secondary vector member (apparent wind speed member) 15 which is a circular disk having an apparent wind speed vector or scale 17 inscribed thereon, and calibrated in evenly spaced units equal to those of boat speed scale 13 on base plate 10 with every fifth unit being numbered. The secondary vector member 15 is shown in a top view in FIG. 5. The second plate 14 has a protractor scale 16 inscribed on the plate adjacent hole 18. Plate 14 can be slideably moved while resting on plate 10 so that the zero point on disk 15 as held in the hole 18 in plate 14, will intersect the boat speed scale 13 at the value representing the speed of the boat and disk 15 can be rotated so that vector 17 represents the direction in which the apparent wind is blowing.

Figure 6:
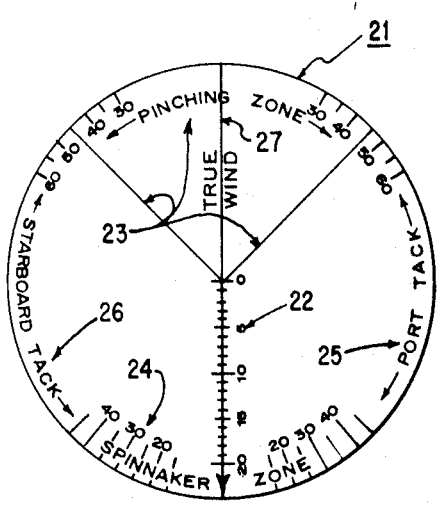
Figure 7:
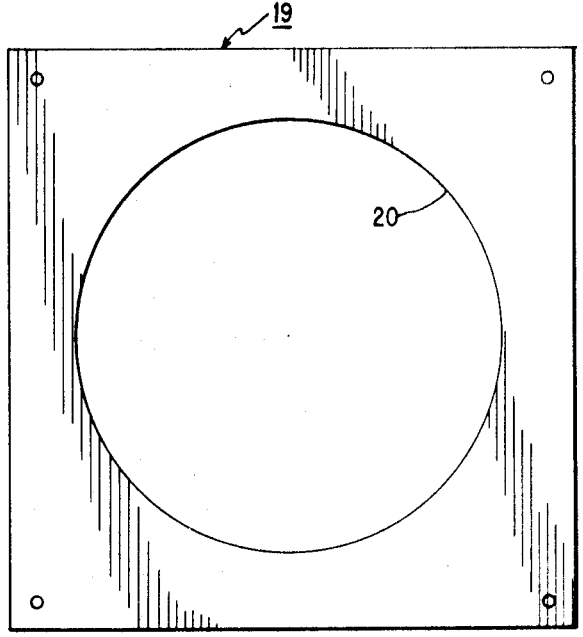
Figure 8:
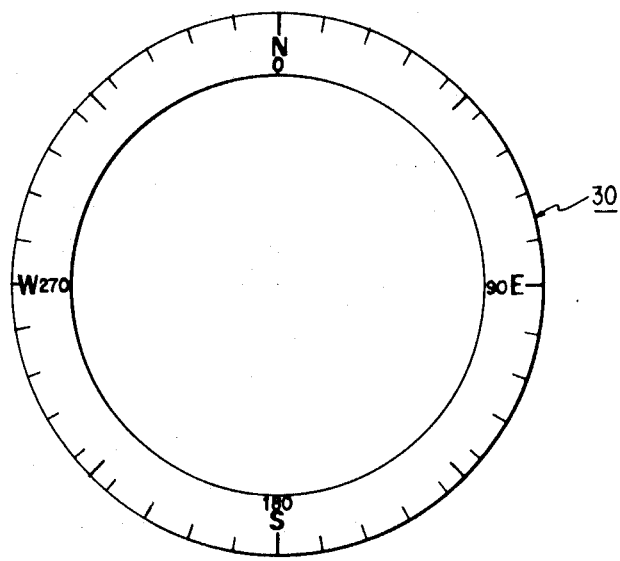

Fastened upon base plate 10 by screws 33 is a third or resulting vector plate 19 (a top view being shown in FIG. 7) which has a circular hole 20 rotatably holding a resulting vector member (a true wind speed disk) 21. FIG. 6 shows a top view of the resulting vector member 21 which has a true wind speed scale or vector 22 inscribed thereon and calibrated numerically. Also inscribed on member 21 is a pinching zone 23 which is an angle extending on the other (opposite) side of the zero reading from scale 22. Line 27 is an extension of scale 22 dividing the pinching zone 23 into two portions. This pinching zone 23 has protractor calibrations within the zone 23 and extending about 60 degrees on each side of line 27. The forward end of scale 22 divides in half a spinnaker zone 24 which is calibrated in degrees on each side of scale 22. As used in this description, the term "pinching" is standard sailing terminology referring to the act of heading a boat so close to the direction the wind is coming from that the boat performs poorly. When a boat is steered so it is heading too close to the wind (or within a few degrees of the wind as influenced by the characteristics of the boat) "pinching" results, which is a loss of full power in the sails due to the wind being inefficiently caught in the sails of the boat. The term "spinnaker zone," as used herein, refers to the directions that a boat may be sailed while flying a spinnaker type sail. It is, in general, the same direction the wind is blowing and a few degrees (depending on the characteristics of the boat) to the right and left of the direction the wind is blowing. In FIG. 6, between the pinching zone and the spinnaker zone to the left side of scale 22 there is labeled a "starboard tack" area 26 and to the right side of scale 22 between the pinching zone and the spinnaker zone there is labeled a "port tack" area 25. A starboard tack means the wind is coming from the starboard (right) side of the boat, and the boat is said to be heading on a starboard tack due to this wind. A port tack means the wind is coming from the port (left) side of the boat, and the boat is said to be heading on a port tack due to this wind. Before changing the direction of a boat, it is advantageous to show beforehand if the boat will be on a starboard or port tack so that equipment and rigging can be arranged properly.

Figure 9:
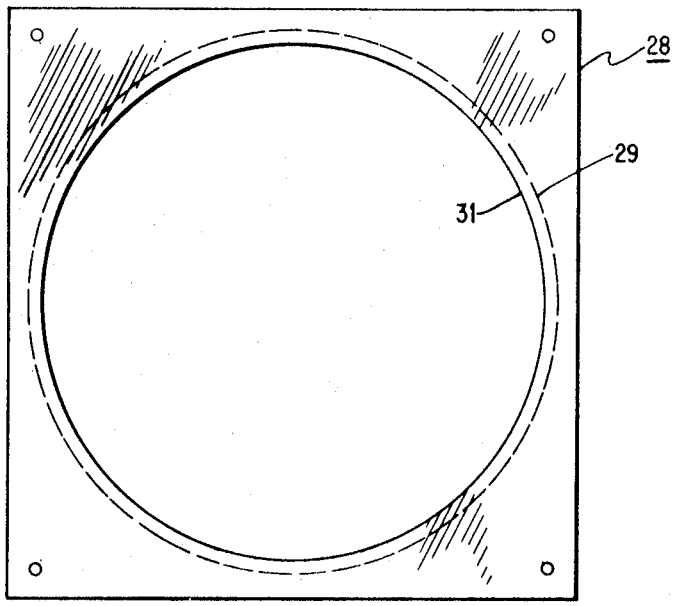
Figure 10:
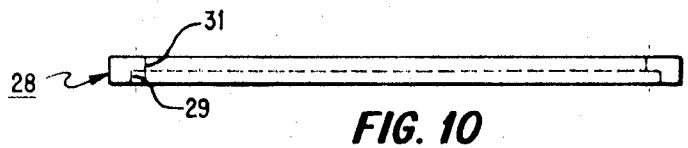
FIG. 10 shows a side view of the part shown in FIG. 9.

Attached on top of third plate 19 by screws 33 is fourth plate 28 (a top view being shown in FIG. 9 and a side view in FIG. 20) which has a hole 29 therein capable of receiving a compass rose 30 which is a thin ring having degree calibrations. The circular depression 29 in plate 28 is sufficient to hold compass rose 30 but enable easy rotation of the compass rose as held in plate 28 while resting on plate 19. Plate 28 has smaller hole 31 enabling the operator to have access to compass rose 30 (to rotate it as desired) and to disk 21 (to rotate it as desired) from the top of the compact calculator while holes 12 in base plate 10 enable the operator to have access to plate 14 and disk 15 to slide this plate 14 and disk 15 in combination as desired, and further to rotate disk 15 as desired.

Figure 2:
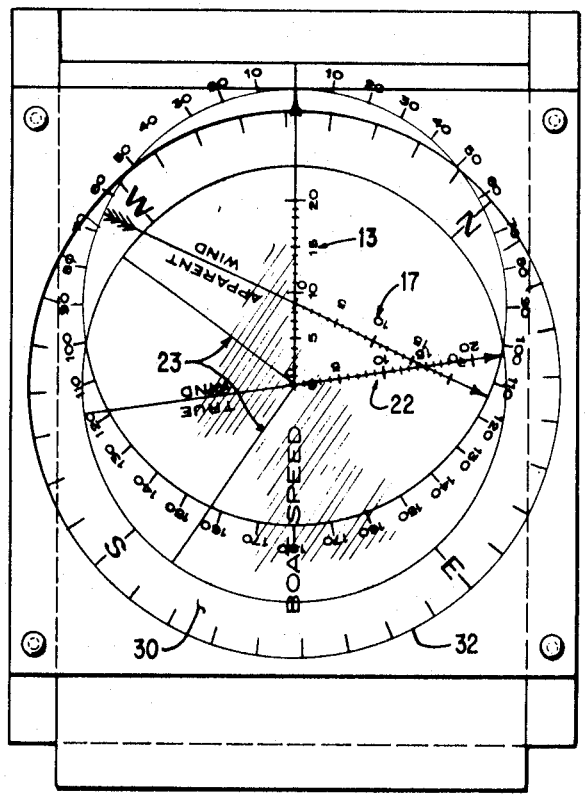
FIG. 2 is a top view of the calculator shown in FIG. 1 showing a solution of a sailing problem.

The operation of the compact calculator will now be described with particular reference to FIG. 2 showing a top view of the assembled calculator. In order to use the calculator during sailing, two readings must be ascertained which usually are available on most boats from instrumentation on the boat. These readings are the boat speed, usually obtainable from a speedometer on the boat, and the speed of the wind which is called the apparent wind speed herein and the apparent direction of the wind, these usually being obtained from a wind gauge. Knowing these readings the operator then slides second plate 14 so that the zero calibration mark of the apparent wind scale 17 on disk 15 comes to rest on the calibration mark on the boat speed scale 13 on plate 10 which reflects the speed of the boat. The operator will move the apparent wind scale 17 so the arrow points in the direction the wind is apparently blowing by rotating disk 15 with his fingers through openings 12 in first plate 10, the disk 15 being easily rotated as it is held within circular opening 18 in second plate 14. Usually the operator holds the calculator so the boat speed vector points in the direction the boat is heading for ease of orientation. Next the operator rotates resulting vector disk 21 as it is held in third plate 19 so that the true wind vector 22 comes to rest on the apparent wind vector scale 17 on disk 15 at the calibration on scale 17 which reflects the apparent wind speed read from the wind gauge. Scale 22 on plate 21 which is labeled true wind now indicates the direction of the actual wind over the water. The numerical value on scale 22 where this scale intersects scale 17 is the value of the actual wind speed. Also of important to the sailor is the determination of the approximate pinching zone for his boat which is defined by area 23 which is an area drawn at 45 degree angles on each side of an extension 27 of the true wind scale 22 on disk 21. This zone provides the sailor with the directions in which he cannot head his boat without losing the wind in his sails. This calculator also provides the sailor with three additional points of information: the spinnaker zone, the direction for a starboard tack and the direction for a port tack. The spinnaker zone defines for the sailor the directions in which the boat may sail with the wind in a spinnaker sail. The angle between the course of the boat and the apparent wind direction can be gained by referring to protractor scale 16 on plate 14. Further compass rose 30 can be used to give the angle between the resultant vector (true wind) and the boat speed vector when desired. This compass rose 30 may also be used to relate the true wind to compass bearings.

The components of the compact true wind velocity calculator can be made from plastics such as plexiglass and polyethylene with plate 10 being transparent or opaque and the other components being transparent. The parts can be fabricated by stamping the holes or sawing the holes in the plastics. The scales and various markings may be inscribed on the plates and disks by cutting the marks or by etching with application of paint for aiding visibility. Representative dimensions for the plates would be 5 to 10 inches by 4 to 8 inches with a thickness of 1/16 to ⅛ inch. The disks may be 2 to 3 inches in diameter with the same thickness as the plates. The compass rose may be ⅝ to 1 inch across the ring with approximately half the thickness as the plates and disks. These dimensions are in no sense a limitation on the teaching of this invention as dimensions outside those given above may be used.

EXAMPLE 1

In greater detail FIG. 2 gives a solution of a problem for a sailor who wishes to know the actual direction and speed of the wind where the boat speed is 9 knots per hour as indicated by the speedometer on the boat and the apparent wind is 17 knots per hour at an angle of 115 degrees to the boat direction. Here the apparent wind velocity scale 17 is moved by rotating disk 15 and sliding plate 14 and enclosed disk 15 so that the zero reading of scale 17 comes to rest on boat speed scale 13 at the ninth calibration on scale 13. At this time the apparent direction of the wind in relation to the boat direction is set by rotating disk 15 until the arrow of scale 17 points to 115 degrees on protractor scale 16 on plate 14. The true wind speed or resultant vector scale 22 is rotated so that the scale 22 intersects the apparent wind speed scale 17 at the velocity of the wind of 17 knots by rotating disk 21 as it is held within third plate 19 between plates 14 and 28. The value on scale 22 where it intersects scale 17 gives the magnitude of the resultant of the two vectors, boat velocity and apparent wind velocity, which is the true wind velocity. The direction of true wind can be read by reading the compass rose bearing on scale 30 at the place where the true wind vector on scale 22 points. Disk 21 now also indicates the defined directions of the pinching zone 23, the spinnaker zone 24, the starboard tack area 26 and the port tack area 25. The compass rose 30 which surrounds disk 21 gives the compass bearing of these respective zones and areas.

Another embodiment of the invention is shown by a top view in FIG. 11 and a side view in FIG. 12 in which 34 represents a primary vector means (boat speed scale) in the general shape of a boat calibrated with a numbered scale 34' with 18 calibrations representing the boat speed in units per time period. Scale 34' has at one end a protractor scale 35 with a hole 36 in the center of the protractor scale 35. A slot 37, capable of receiving a slideable, pivotal connection of another member, runs the length of the calibrated portion of boat speed scale 34'. Attached at hole 36 in protractor scale 35 by pin 40 is secondary vector means 38 having a hole 39 therein receiving pivotal fastening means or pin 40. Pin 40 holds primary vector means 34 to secondary vector means 38 in a rotatable connection. The secondary vector means 38 has slot 41 capable of receiving a slideable, pivotal connection of another member and an apparent wind speed scale 38'. Attached to members 34 and 38 is a resulting vector means 42 with one end having a calibrated disk 43 with a hole 44 in the center of the disk 43 receiving a pivotal, slideable fastening means or pin 45 and receiver 54 connecting member 42 to member 34. A slot 46 capable of receiving a slideable, pivotal connection of another member runs the length of the calibrated portion of scale 42'. A fastening means or pin 47 and receiver 48, which also acts as a washer between members 38 and 42, enables a slideable, pivotal movement of the members it attaches, holding secondary vector means 38 to resulting vector means 42.

The disk 43 will now be discussed in greater detail. There is inscribed a pinching zone or region 49 which is an angle extending on the other side of the zero reading from the scale 42' on member 42. A line 50 which is an extension of scale 42 divides the pinching zone 49 into two portions. This pinching zone 49 has protractor calibrations within the zone 49 and extending beyond the pinching zone. The scale 42' and slot 46 of resulting vector 42 divides in half a spinnaker zone 51 which is calibrated in degrees on each side of slot 46. Between the pinching zone and the spinnaker zone to the left side of calibrated disk 43 there is a region labeled a "starboard tack" area and to the right side of disk 43 between the pinching zone and the spinnaker zone there is labeled a "port tack" area. It is preferable that the zones on disk 43 be labeled in contrasting colors to those used elsewhere on the calculator. The pin 40 holding member 38 to member 34 at protractor scale 35 enables a pivotal movement of member 38 in relation to member 34. Pin 47 and receiver 48 holding member 38 to member 42 allow a pivotal and/or slideable movement of member 38 in relation to member 42 as does pin 45 and receiver 54 for members 34 and 42.

The components of the true wind velocity calculator of FIGS. 11 and 12 can be made from plastics such as plexiglass or polyethylene. The parts can be fabricated by stamping from sheet stock as well as stamping the holes or slots or by sawing the slots in the plastic pieces. The scales and the various other markings may be inscribed on the members by etching with application of paint for aiding visibility. Representative dimensions for the scales would be 4 to 8 inches long with a width of ⅜ to ¾ inches and a thickness of 1/32 to ¼ inch, with the protractor scales being 1 to 4 inches in diameter. These dimensions are given by way of example and dimensions beyond these ranges can be employed.

EXAMPLE 2

FIG. 11 gives a solution of a problem for a sailor considering changing the tack of his sailboat. Here the boat speed is 13 knots per hour as indicated by the speedometer reading on the boat and the apparent wind 11.5 knots per hour at an angle of 52 degrees from the port of the boat heading. The operator begins his resolution of the desired determinations by loosening receiver 54 as it holds pin 45 and receiver 48 as it holds pin 47 and sliding and pivoting member 42 until the pin 45 comes to rest on the 13th calibration on scale 34 at which time pin 45 and receiver 54 are again tightened somewhat but still enabling further pivoting of member 42. Next receiver 48 and pin 47 are moved along the slot 41 in member 38 so that pin 47 comes to rest in between the 11th and 12th calibration on member 38 without moving pin 45 from the 13th calibration on member 34. Next while pin 47 and receiver 48 are kept in their position in slot 41, pin 47 is moved along the slot 46 in member 42 until the member 38 lines up with the correct apparent wind direction of 52 degrees on protractor means 35 on member 34. While the last step is being performed member 42 will pivot on pin 45. The location of pin 47 in slot 46 of member 42, the resultant vector, tells the actual wind speed. The direction that member 42 points is the direction of the actual wind (true wind). In addition, protractor means 43 gives the additional defined areas of the pinching zone, the spinnaker zone, the starboard tack area and the port tack area.

Each sailing craft has its own characteristics contributing to the area of the pinching zone for that craft. Among the many factors are (1) the resistance between the surface of the hull of the boat and the water, (2) the weight, draft and length of the boat and (3) the general shape of the hull of the boat. By experience the sailor will be able to allow either extra area or less area to the defined pinching zone on his calculator or use the actual pinching zone defined on the calculator of this invention as the characteristics of his boat dictate.

The foregoing typical examples clearly demonstrate the useful scope of the improved calculator means disclosed herein and its applicability to prompt and facile solution substantially all problems involving vectors and piloting of a sailing craft encountered by a sailor. The simple construction and unitary assembly of the device enhance its availability and convenience in use of sailors during competitive racing of their sailing craft plus bringing within reach of the individual small sail craft operator determinations of navigational security and efficiency heretofore available to him.

Since many changes, variations and modifications in the specific form, construction, proportions, arrangement and calibration of the calculators shown and described herein may be made without departing from the spirit of the invention, it is to be understood that this invention is not to be limited except by the scope of the appended claims, rather than by any details of the illustrative showing and foregoing description.

I claim:

1. A vector calculator suitable for use in boating comprising, in combination,
   a. a primary vector member having a calibrated scale inscribed thereon,
   b. a secondary vector member having a calibrated scale inscribed thereon movably connected to and capable of rotation with respect to the primary vector member, and
   c. a resulting vector member having a calibrated scale inscribed thereon movably connected to and capable of rotation with respect to the primary vector member and movably connected to the secondary vector member so that the secondary vector member is capable of rotation with respect to the resulting vector member, the resulting vector member having defined thereon a pinching zone and a spinnaker zone drawn about 45° on each side of the rearward extension of the scale on the resulting vector member, and the vector members are capable of being moved so that the scales intersect appropriately to enable resolution of vector problems.

2. The calculator of claim 1 which has a compass means in association with the resulting vector member.

3. The calculator of claim 1 in which the primary vector member is a first plate with restraining guides, the secondary vector member is a circular disk rotatably fitting in a second plate having a hole therein receiving the disk, the second plate being slideably held within the restraining guides, the resulting vector member is a second circular disk rotatably fitting in a hole in a third plate fastened on the restraining guides, and the calibrated scales on the primary vector member, secondary vector member and resulting vector member are, respectively, a boat speed scale, an apparent wind scale and a resulting vector scale.

4. The calculator of claim 3 which has a compass rose rotatably held in a circular depression in a fourth plate with the fourth plate being fastened on the third plate, and the fourth plate having a hole therein enabling manual access to the compass rose and the second circular disk.

5. The calculator of claim 3 in which the first plate is opaque with the remaining components being transparent.

6. The calculator of claim 3 in which the components are plexiglass.

7. The calculator of claim 3 in which the first plate is an opaque plexiglass with the remaining components being transparent plexiglass.

8. The calculator of claim 1 in which the primary vector member is a calibrated ruler means with a slot running a substantial portion thereof with one end of said ruler means being an expanded protractor portion, the secondary vector member is a calibrated ruler means with a slot running a substantial portion thereof, the secondary vector member being pivotally fastened to the primary vector member, and the resulting vector member is a calibrated ruler means with a slot running a substantial portion thereof, the resulting vector member being pivotally and slideably connected to the primary vector member and the secondary vector member with one end of the resulting vector member being an expanded protractor portion which defines the pinching zone and the spinnaker zone adapted for providing sailing information.

9. The calculator of claim 8 where the components are plexiglass pivotally and slidably connected by pins and receivers.

* * * * *